United States Patent
McCully et al.

(10) Patent No.: US 10,448,568 B2
(45) Date of Patent: Oct. 22, 2019

(54) AUTOMATICALLY SECURING UNLOADING AUGER SUPPORT

(71) Applicant: CNH Industrial America LLC, New Holland, PA (US)

(72) Inventors: William M. McCully, Lancaster, PA (US); Clayton E. Banks, Jr., Brownstown, PA (US)

(73) Assignee: CNH INDUSTRIAL AMERICA LLC, New Holland, PA (US)

(*) Notice: Subject to any disclaimer, the term of this patent is extended or adjusted under 35 U.S.C. 154(b) by 717 days.

(21) Appl. No.: 14/882,936

(22) Filed: Oct. 14, 2015

(65) Prior Publication Data
US 2017/0105342 A1  Apr. 20, 2017

(51) Int. Cl.
*A01F 12/46* (2006.01)
*A01D 41/12* (2006.01)
*A01D 75/18* (2006.01)

(52) U.S. Cl.
CPC ......... *A01D 41/1217* (2013.01); *A01D 75/18* (2013.01)

(58) Field of Classification Search
CPC .................................................. A01D 41/1217
USPC ....................................................... 460/114
See application file for complete search history.

(56) References Cited

U.S. PATENT DOCUMENTS

| | | | |
|---|---|---|---|
| 3,521,768 A * | 7/1970 | Helmut | A01D 41/1217 198/538 |
| 3,721,359 A * | 3/1973 | Howell | A01D 41/1217 285/311 |
| 3,834,564 A | 9/1974 | Laurent et al. | |
| 3,995,754 A * | 12/1976 | DeKoning | B60P 1/60 15/340.1 |
| 4,225,282 A * | 9/1980 | Nordstrom | E02F 3/388 414/694 |
| 4,390,094 A * | 6/1983 | Schoeneberger | B65G 21/12 198/320 |
| 4,391,364 A * | 7/1983 | Young | B65G 21/12 198/320 |
| 4,427,105 A * | 1/1984 | Hawley | B65G 41/002 198/632 |
| 4,522,552 A * | 6/1985 | Raineri | A01D 41/1217 198/316.1 |
| 4,613,275 A * | 9/1986 | Karlowsky | B60P 1/40 198/632 |
| 4,742,938 A * | 5/1988 | Niewold | B65G 21/12 198/315 |

(Continued)

FOREIGN PATENT DOCUMENTS

| | | |
|---|---|---|
| JP | 2001-314115 A | 11/2001 |
| JP | 2001-314116 A | 11/2001 |
| JP | 2013-13335 A | 1/2013 |

*Primary Examiner* — Robert E Pezzuto
*Assistant Examiner* — Mai T Nguyen
(74) *Attorney, Agent, or Firm* — Peter K. Zacharias; Patrick M. Sheldrake

(57) ABSTRACT

An unloading auger locking mechanism for use by an agricultural harvester, allowing the secure retainment of an unloading auger while it is in its stored position, accomplished by the passive locking between a latch assembly mounted on the unloading auger and an actuated hook assembly on the chassis, further allowing the unlocking of the mechanism by remote actuation. Locking and unlocking of the unloading auger can therefore be accomplished without the operator leaving the cab.

17 Claims, 3 Drawing Sheets

(56) References Cited

U.S. PATENT DOCUMENTS

| | | | | |
|---|---|---|---|---|
| 5,191,942 A | * | 3/1993 | Bussiere | A01B 21/04 |
| | | | | 172/248 |
| 5,518,453 A | | 5/1996 | Tribbett | |
| 5,876,176 A | * | 3/1999 | Smith | B60P 1/42 |
| | | | | 198/320 |
| 8,740,679 B2 | | 6/2014 | Hollatz | |
| 8,967,940 B2 | * | 3/2015 | Petersen | A01C 15/003 |
| | | | | 414/523 |

* cited by examiner

AUTOMATICALLY SECURING UNLOADING AUGER SUPPORT

BACKGROUND OF THE INVENTION

1. Field of the Invention

The present invention relates to agricultural vehicles such as combines, and, more particularly, to the securing of unloading augers used on such vehicles.

2. Description of the Related Art

An agricultural vehicle known as a "combine" is historically termed such because it combines multiple harvesting functions with a single harvesting unit, such as picking, threshing, separating and cleaning A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

The clean grain is transferred to another container, usually a container on a separate transport vehicle, either while the combine is stopped or while it is in motion. The transfer of clean grain from the combine to an external container is by various methods which propel the clean grain through an unloading auger. The unloading auger swings away from the combine and directs the clean grain into the external carrier. After the unloading auger has been utilized, it is swung back to the combine.

While the combine is in operation in the field, a "rod and tusk" system or other apparatus can be utilized to minimize vertical travel, or "bouncing", of the unloading auger while in the storage position resulting from the combine encountering rough terrain. This vertical travel, or "bouncing", can result in a "hammer/anvil" type action between the unloading auger and the support saddle, which can be quite violent and result in structural damage to the unloading auger or grain loss from the discharge end. During the time the combine is not in use for harvesting, but is traveling from place to place, a removable pin such as a "klik pin" is typically used to prevent the unloading auger from horizontal travel in the event of hydraulic failure or other causes. While the aforementioned vertical travel and horizontal travel of the unloading auger is minimized by securing it with the "rod and tusk" system and "klik pins", the securing is by design an active one; i.e., the operator must manually secure the unloading auger to ensure it is locked down. The operator may forget to lock the unloading auger down, and may also expose himself to hot or sharp surfaces.

What is needed in the art is a passive way to secure the unloading auger of an agricultural harvester to prevent horizontal or vertical movement when the harvester is in motion.

SUMMARY OF THE INVENTION

The present invention provides an agricultural harvester including an unloading auger locking mechanism, with features that enable a passive locking and unlocking of the unloading auger.

The invention in one form is directed to an agricultural harvester, including an unloading auger with a latch assembly fixed to it which automatically engages with an actuated hook assembly fixed to the chassis when placed into a stored position; thereby securing the unloading auger from moving in a horizontal or vertical direction.

The invention in another form is directed to an agricultural harvester, including an unloading auger which, after being securely latched to the chassis, is automatically unlatched when it is swung away from the chassis.

The invention in still another form is directed to an agricultural harvester, including an unloading auger, which when in a stored position is proximate a support cradle while simultaneously secured by a latch assembly and an actuated hook assembly.

An advantage of the present invention is the ability to passively secure the unloading auger on an agricultural harvester in the horizontal direction and the vertical direction every time it is brought back to its resting position. Therefore, the possibility of the operator forgetting to lock down the unloading auger is eliminated.

Another advantage of the present invention is the operator is able to remain in the cab during the securement of the unloading auger; that is, no active participation is necessary other than the normal moving of the unloading auger.

Another advantage of the present invention is the ability for the unloading auger to be unlocked by the operator while he is still in the cab.

Still another advantage of the present invention is the relatively low profile of the unloading auger locking mechanism, in that it does not protrude downward past the unloading auger itself.

Still another advantage of the present invention is the secure stored position of the unloading auger by simultaneously resting on a support cradle and attachment to the chassis.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
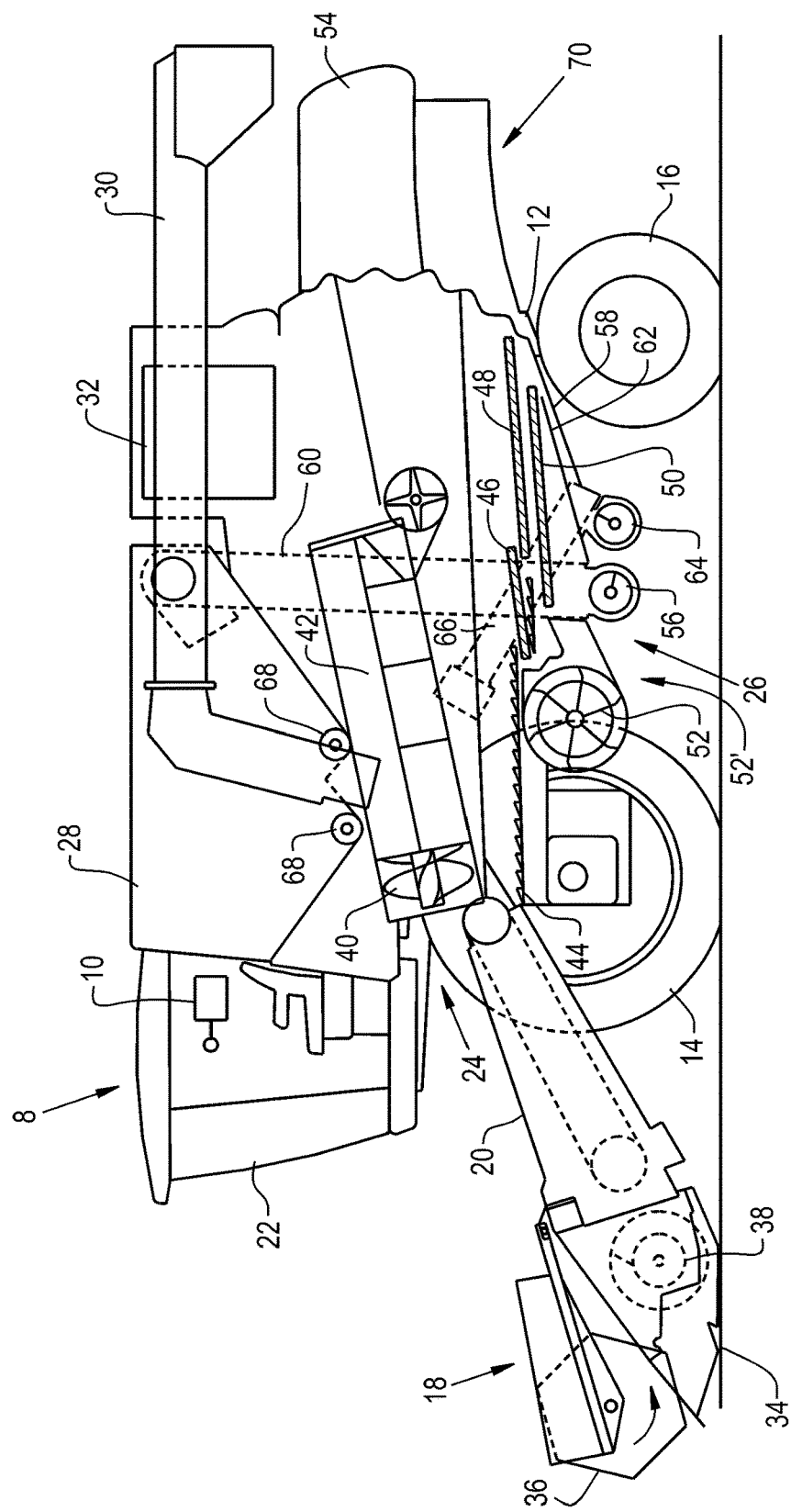
FIG. 1 is a side view of an embodiment of an agricultural vehicle in the form of a combine, which may include an embodiment of an unloading auger securing mechanism of the present invention.

Referring now to the drawings, and more particularly to FIG. 1, there is shown an agricultural vehicle in the form of a combine 8, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 8 is shown as including wheels, is also to be understood that combine 8 may include tracks, such as full tracks or half tracks.

Header 18 is mounted to the front of combine 8 and includes a cutter bar 34 for severing crops from a field during forward motion of combine 8. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 8. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 8. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from sieve 50 and from trough 62 of cleaning system 26. Clean grain auger 56 conveys the clean grain laterally to a generally vertically arranged grain elevator 60 for transport to grain tank 28. Tailings from cleaning system 26 fall to a tailings pan 58, then into a tailings trough which contains tailings auger 64. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 8.

When the clean grain is unloaded from combine 8, unloading auger 30 is swung away from chassis 12 and maneuvered to a position where the clean grain is then transferred to another storage area. This can be done while combine 8 is in motion; for example, a truck or towed trailer moves alongside combine 8 while the clean grain is transferred. The clean grain transfer can also occur while combine 8 is stationary; for example, a truck or trailer is placed near the stopped combine 8 while the clean grain is transferred.

In either mode of clean grain transfer, unloading auger 30 is swung back to chassis 12 and secured against movement while combine 8 is in motion.

Figure 2:
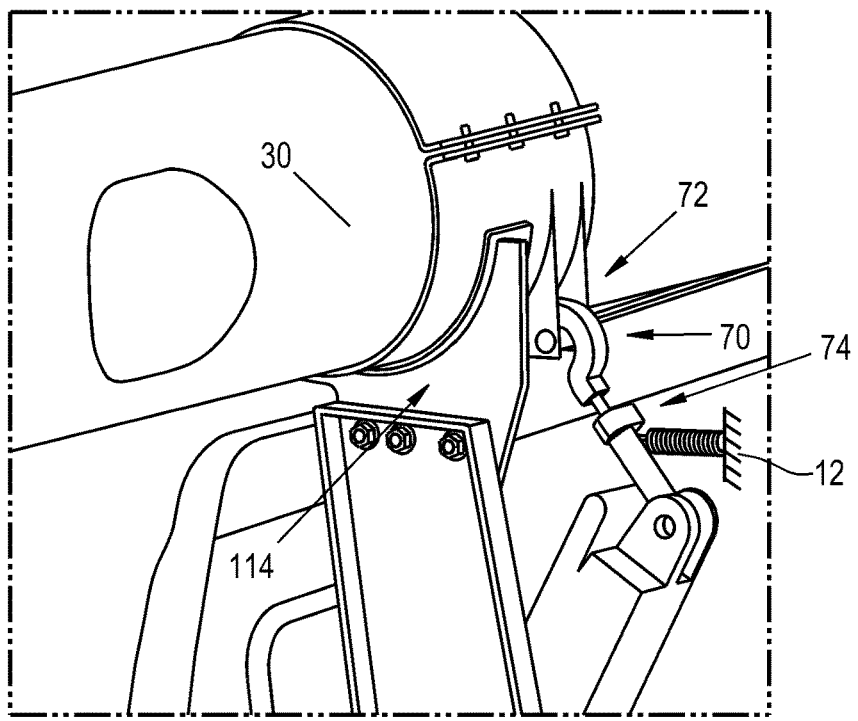
FIG. 2 is an isometric view of an embodiment of an unloading auger securing mechanism of the present invention.

Combine 8 includes an unloading auger securing mechanism 70 according to the described invention herein (FIG. 2). Unloading auger securing mechanism 70 includes a latch assembly 72 attached to unloading auger 30, and an actuated hook assembly 74 attached to chassis 12. Support cradle 114, not part of unloading auger securing mechanism 70, is also illustrated and explained further in this specification.

Figure 3:
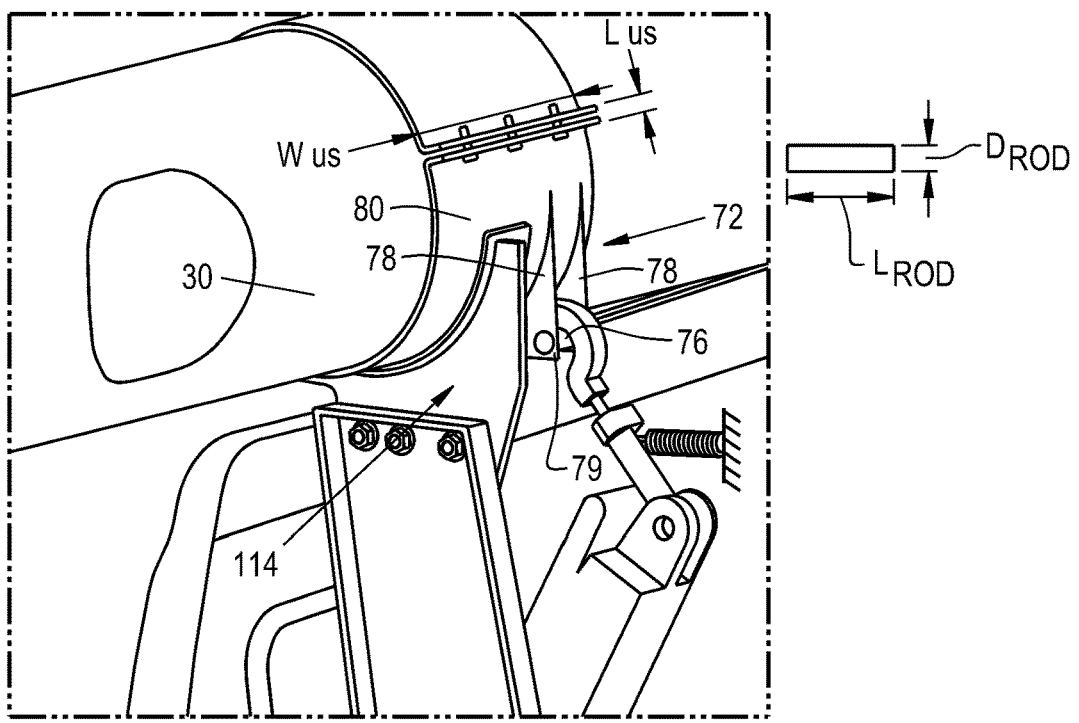
FIG. 3 is an isometric view of the latch assembly of the unloading auger securing mechanism of FIG. 2.

Referring now to FIG. 3, latch assembly 72 is attached to unloading auger 30. Latch assembly 72 includes a latch rod 76, two flanges 78, and mounting strap 80. Latch rod 76 is typically cylindrical in cross-section, but may be hexagonal or another shape. Latch rod 76 has a length LROD and an outer diameter DROP, and is constructed of metal or any material capable of withstanding external forces.

Each flange 78 has a through-hole 79. Flanges 78 may be fixed to unloading auger 30 or mounting strap 80. When latch assembly 72 is assembled and fixed to unloading auger 30 or mounting strap 80, flanges 78 are parallel to each other and spaced apart no more than length LROD; that is, latch rod 76 is supported between flanges 78 and parallel to unloading auger 30. Latch rod 76 may be permanently attached to flanges 78, for example by welding. Alternatively, latch rod 76 may be in the form of a removable pin.

When latch assembly 72 is assembled and fixed to unloading auger 30 or mounting strap 80, latch rod 76 is held by flanges 78 such that it is a fixed distance from unloading auger 30 or mounting strap 80, in order to allow actuated hook assembly 74 to engage and disengage latch assembly 72 without contacting unloading auger 30 or mounting strap 80.

Mounting strap 80 has a width $W_{MS}$ and length $L_{MS}$. Width $W_{MS}$ is at least wide enough to accommodate the fixation of latch assembly 72, and may also be wide enough to additionally provide a surface to contact support cradle 114 when unloading auger 30 is moved into and resting in its stored position. Length $L_{MS}$ of mounting strap 80 is sufficient to secure it permanently or temporarily to the outer surface of unloading auger 30; that is, it can be just long enough to accommodate latch assembly 72 or long enough to completely encircle unloading auger 30, or any length in between.

Mounting strap 80 can be attached temporarily to unloading auger 30; for example, the two ends may be able to clamp or otherwise attach to one another in order to affect a temporarily secure fit around the outer surface of unloading auger 30. Therefore, mounting strap 80 with latch assembly 72 affixed to it may be removed or adjusted in position along or around unloading auger 30 as needed. Alternatively, mounting strap 80 can be attached permanently to unloading auger 30; for example, by welding.

Figure 4:
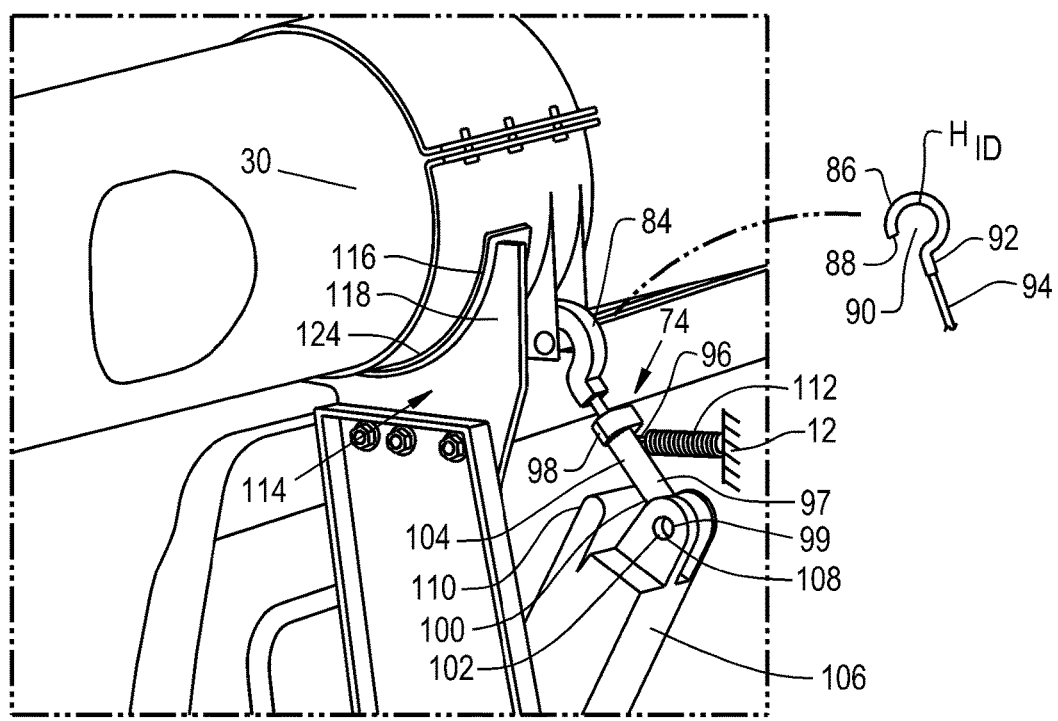
FIG. 4 is an isometric view of the actuated hook assembly of the unloading auger securing mechanism of FIG. 2.

Referring now to FIG. 4, actuated hook assembly 74 is described herein. Actuated hook assembly 74 includes hook 84, actuated cylinder 96, spring 112, pivot pin 99, and mount 106.

Hook 84 includes tip 88, receiving area 90, inner diameter $H_{ID}$, trailing end 92, and actuating rod 94. Inner diameter $H_{ID}$ must be at least larger than outer diameter $D_{ROD}$ in order for latch rod 76 to be captured and retained by hook 84. Attached to trailing end 92 is actuating rod 94, which works in retention and cooperation with actuated cylinder 96 to extend and retract hook 84, the purpose of which is explained further in this specification. Trailing end 92 and actuating rod 94 are permanently joined in axial alignment. It is also possible for trailing end 92 itself to be retained and manipulated by actuated cylinder 96.

As previously stated, actuated cylinder 96 retains and cooperates with trailing end 92 of hook 84. Actuated cylinder comprises a working end 98, base end 100, and through-hole 102. Internal to actuated cylinder 96 is actuator 104 (not shown), which can be operated remotely by an electronic control unit 10 (FIG. 1) to extend or retract hook 84. Connecting through-holes 102 (on actuated cylinder 96) and 108 (on mount 106) with pivot pin 99 attaches actuated cylinder 96—and therefore actuated hook assembly 74—to mount 106, enabling actuated hook assembly 74 to freely pivot under external loads. Attached to actuated cylinder 96 is spring 112. Spring 112 is also attached to chassis 12 or a portion thereof, and urges hook assembly 74 towards unloader auger 30 until stopped by protrusion 110 on mount 106 or by other means. Alternatively, actuated hook assembly is coupled to mount 106 in a fixed position.

Continuing to refer to FIG. 4, support cradle 114 is described herein. Support cradle 114 includes contact pad 116, and body 118. Contact pad 116 is designed to have generally the same concave geometry as all or a portion of the outer diameter of unloader auger 30 in order to provide secure retention. Contact pad 116 may be replaceable in the event of wear or damage. A sensor 124 (not shown) may be incorporated within or located behind the contact pad 116. Sensor 124 may be used to indicate when unloader auger 30 contacts support cradle 114, as well as provide a signal to electronic control unit 10 to retract hook 84 into actuated cylinder 96 and thereby secure unloader auger 30.

Operation of the unloading auger securing mechanism 70 is now described. After being used to offload clean grain, unloading auger 30 is swung back toward chassis 12. As unloading auger 30 comes into contact with support cradle 114 and has competed its travel and is in a stored position, latch rod 76 of latch assembly 72 is positioned under hook 84 of actuated hook assembly 74. Hook 84 is then automatically retracted into actuated cylinder 96, thereby capturing and retaining latch rod 76 and therefore securing unloading auger 30 against movement in horizontal and vertical directions.

As described previously, sensor 124 may be used to indicate when unloader auger 30 contacts support cradle 114, as well as provide a signal to electronic control unit 10 to retract hook 84 into actuated cylinder 96 and thereby secure unloader auger 30.

The securing of unloading auger to chassis 16 is passive and requires no active participation by the operator, other than control of the unloading auger 30 itself. Advantageously, the operator does not need to leave the cab during storage of the unloader auger 30.

When it is desired to release the unloading auger 30 for offloading clean grain or for other purposes, the operator uses electronic control unit 10 to remotely activate actuator 104 in actuated cylinder 96 to extend hook 84 from actuated cylinder 96 until tip 88 is clear of latch rod 76, thereby separating latch assembly 72 from actuated hook assembly 74 and allowing unloading auger 30 to swing away from chassis 16.

While an unloading auger securing mechanism has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
a chassis;
a threshing and separating system for processing harvested material carried by the chassis;
a movable unloading auger downstream of the harvested material flow from the threshing and separating system; and
an unloading auger securing mechanism capable of coupling the unloading auger to a portion of the chassis, the unloading auger securing mechanism including:
a latch assembly fixedly mounted to the unloading auger; and
an actuated hook assembly attached to the chassis, the actuated hook assembly comprising a hook and an actuated cylinder slidably containing a portion of the hook and configured to retract the hook to capture a portion of the latch assembly such that the unloading auger is vertically secured against upward motion when the unloading auger is in a stored position.

2. The agricultural harvester of claim 1, wherein the unloading auger is passively secured when moved into the stored position.

3. The agricultural harvester of claim 1, wherein the latch assembly comprises:
two flanges; and
a latch rod, whereby the latch rod is suspended between the two flanges at a fixed distance from the unloading auger.

4. The agricultural harvester of claim 1, wherein the latch assembly is mounted to a strap which at least partially circumferentially surrounds the unloading auger.

5. The agricultural harvester of claim 1, wherein the actuated hook assembly is pivotally attached to the chassis.

6. The agricultural harvester of claim 1, wherein the hook engages with the latch rod when the unloading auger is moved to the stored position.

7. The agricultural harvester of claim 1, wherein the actuated cylinder is remotely operable.

8. The agricultural harvester of claim 1, wherein the actuated cylinder is used to extend the hook toward the unloading auger when the unloading auger is in the stored position, thereby permitting the unloading auger to be swung away from the stored position.

9. An unloading auger securing mechanism capable of coupling an unloading auger to a portion of a chassis, the unloading auger securing mechanism including:
a latch assembly fixedly mounted to the unloading auger; and
an actuated hook assembly attached to the chassis, the actuated hook assembly comprising a hook and an actuated cylinder slidably containing a portion of the hook and configured to retract the hook to capture a portion of the latch assembly such that the unloading auger is vertically secured against upward motion when the unloading auger is in a stored position.

10. The unloading auger securing mechanism of claim 9, wherein the unloading auger is passively secured when moved into the stored position.

11. The unloading auger securing mechanism of claim 9, wherein the latch assembly comprises:
two flanges; and
a latch rod, whereby the latch rod is suspended between the two flanges at a fixed distance from the unloading auger.

12. The unloading auger securing mechanism of claim 9, wherein the latch assembly is mounted to a strap which at least partially circumferentially surrounds the unloading auger.

13. The unloading auger securing mechanism of claim 9, wherein the actuated hook assembly is pivotally attached to the chassis.

14. The unloading auger securing mechanism of claim 9, wherein the hook engages with the latch rod when the unloading auger is moved to the stored position.

15. The unloading auger securing mechanism of claim 9, wherein the actuated cylinder is remotely operable.

16. The unloading auger securing mechanism of claim 9, wherein the actuated cylinder is used to extend the hook toward the unloading auger when the unloading auger is in the stored position, thereby permitting the unloading auger to be swung away from the stored position.

17. An agricultural harvester, comprising:
a chassis;
a threshing and separating system for processing harvested material carried by the chassis;
a movable unloading auger downstream of the harvested material flow from the threshing and separating system; and
an unloading auger securing mechanism capable of coupling the unloading auger to a portion of the chassis, the unloading auger securing mechanism including:
a latch assembly fixedly mounted to the unloading auger; and
an actuated hook assembly attached to the chassis, the actuated hook assembly comprising:
a hook; and
an actuated cylinder slidably containing a portion of the hook, wherein the actuated cylinder is used to extend the hook toward the unloading auger when the unloading auger is in a stored position, thereby permitting the unloading auger to be swung away from the stored position.

* * * * *